United States Patent
Lee et al.

(10) Patent No.: US 11,646,791 B2
(45) Date of Patent: May 9, 2023

(54) PASSIVE OPTICAL NETWORK SYSTEMS

(71) Applicant: DZS Inc., Plano, TX (US)

(72) Inventors: Seung Dong Lee, Fremont, CA (US); Jae Goo Kim, Suwon-si (KR)

(73) Assignee: DZS Inc., Plano, TX (US)

( * ) Notice: Subject to any disclaimer, the term of this patent is extended or adjusted under 35 U.S.C. 154(b) by 0 days.

(21) Appl. No.: 17/460,354

(22) Filed: Aug. 30, 2021

(65) Prior Publication Data
US 2022/0069904 A1    Mar. 3, 2022

Related U.S. Application Data

(60) Provisional application No. 63/072,177, filed on Aug. 30, 2020.

(51) Int. Cl.
*H04B 10/27* (2013.01)
*H04B 10/079* (2013.01)

(52) U.S. Cl.
CPC ....... *H04B 10/07955* (2013.01); *H04B 10/27* (2013.01)

(58) Field of Classification Search
CPC ................. H04B 10/27; H04B 10/07955; H04B 10/616; H04J 14/08
See application file for complete search history.

(56) References Cited

U.S. PATENT DOCUMENTS

| | | | |
|---|---|---|---|
| 2008/0193125 A1* | 8/2008 | Weber | H04B 10/07953 398/25 |
| 2012/0141139 A1* | 6/2012 | Bakhru | H04B 10/272 398/158 |
| 2014/0016926 A1* | 1/2014 | Soto | H04B 10/0775 398/16 |
| 2018/0167143 A1* | 6/2018 | Yao | H04B 10/524 |
| 2019/0207702 A1* | 7/2019 | van Veen | H04Q 11/0067 |

* cited by examiner

*Primary Examiner* — Dzung D Tran
(74) *Attorney, Agent, or Firm* — Insight Law Group, PLLC; Seung Lee (57) ABSTRACT

A passive optical network system includes an optical line terminator (OLT) configured to detect signal strength and a phase of a burst-mode uplink signal from each of optical network units (ONUs) to control the ONUs so as to equalize signal strengths of signals received from the ONUs and configured to control the ONUs so as to adjust a phase of each of the signals received from the ONUs, and the ONUs are each configured to control signal strength and phase of an burst-mode uplink signal and transmit a resultant burst-mode uplink signal under control of the OLT.

14 Claims, 6 Drawing Sheets

PASSIVE OPTICAL NETWORK SYSTEMS

CROSS-REFERENCE TO RELATED APPLICATION(S)

This application claims priority from U.S. Provisional Patent Application No. 63/072,177, filed on Aug. 30, 2020, in the e U.S. Patent and Trademark Office, the disclosure of which is incorporated herein by reference in its entirety.

BACKGROUND

1. Field

The following description relates to passive optical network technology, and more particularly, to an optical line terminator supporting passive optical communication transmission standards.

2. Description of Related Art

In a passive optical network (PON) technique used as one of subscriber network techniques using an optical cable medium, an optical signal is split using a splitter that does not require power.

PONs are classified into a time-division multiplexing (TDM)-PON, a wavelength-division multiplexing (WDM)-PON, and a time-and-wavelength-division multiplexing (TWDM)-PON according to a multiplexing method of an uplink signal.

A PON using a TDM method uses a single-wavelength optical signal with respect to an uplink signal and a downlink signal, and particularly, an uplink signal transmitted from an optical network unit (ONU) to an optical line terminator (OLT) is transmitted only in predetermined time slots while data is embedded therein. That is, ONUs should transmit signals only for a short allowed time period and should not transmit any signal in other time periods. This transmission method is called a burst mode transmission method. However, because the OLT receives optical signals from multiple ONUs, overhead bits are added before and after each time slot. An on/off delay of a laser diode of each ONU, the difference in strength between signals from ONUs, the difference between transmission distances to an OLT, and the like should be considered in determining a size of overhead bits.

To reduce the size of overhead bits of an optical signal transmitted from each ONU to the OLT, it is required to reduce a time required for burst mode clock and data recovery (BM-CDR).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description is directed to providing a passive optical network system capable of reducing a time required for burst mode clock and data recovery (BM-CDR) to reduce overhead bits that are included in an uplink optical signal transmitted from an optical network unit (ONU) to an optical line terminator (OLT).

In a general aspect, a passive optical network system includes an OLT and a plurality of ONUs.

The OLT includes a signal specification detector configured to measure signal strength and a phase of an electrical signal converted from a burst-mode uplink optical signal received in each of channels allocated to the ONUs in a test mode, and a remote transmission signal controller configured to determine reference signal strength on the basis of signal strength measured for each of the ONUs, and create and transmit a signal strength control message for control of the signal strength of each of the ONUs according to the reference signal strength and a phase control message for synchronization on the basis of a phase detected for each of the ONUs in units of ONUs.

The ONU includes a controller configured to receive the signal strength control message and the phase control message from the OLT, a signal strength controller configured to control signal strength of the burst-mode uplink optical signal to be changed according to the received signal strength control message, and a phase controller configured to control a delay according to the received phase control message so as to adjust a phase of the burst-mode uplink optical signal.

In a general aspect, the signal strength control message and the phase control message transmitted from the remote transmission signal controller of the OLT may include signal strength increase/decrease information and delay increase/decrease information, respectively.

In a general aspect, the remote transmission signal controller of the OLT may create and transmit the signal strength control message on the basis of the difference between the reference signal strength and signal strength of the burst-mode uplink optical signal measured by the signal specification detector in a data mode.

In a general aspect, the remote transmission signal controller of the OLT may create and transmit the phase control message on the basis of the difference between a desired phase and a phase of the burst-mode uplink optical signal detected by the signal specification detector in the data mode.

In an additional aspect, each of the OLT and the ONUs may further include a guard time setter configured to set a burst mode guard time according to a user input.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and further aspects will be implemented through embodiments described with reference to the accompanying drawings below. It should be understood that components of embodiments can be implemented in various combinations in the embodiments unless mentioned otherwise and as long as there is no contradiction between components. Each block of block diagrams may represent a physical component in some cases but may be a logical representation of part of functions of a physical component or a function performed by a plurality of physical components. In some cases, an entity of a block or part thereof may be a set of program instructions. All or some of such blocks may be implemented by hardware, software or a combination thereof.

Figure 1:
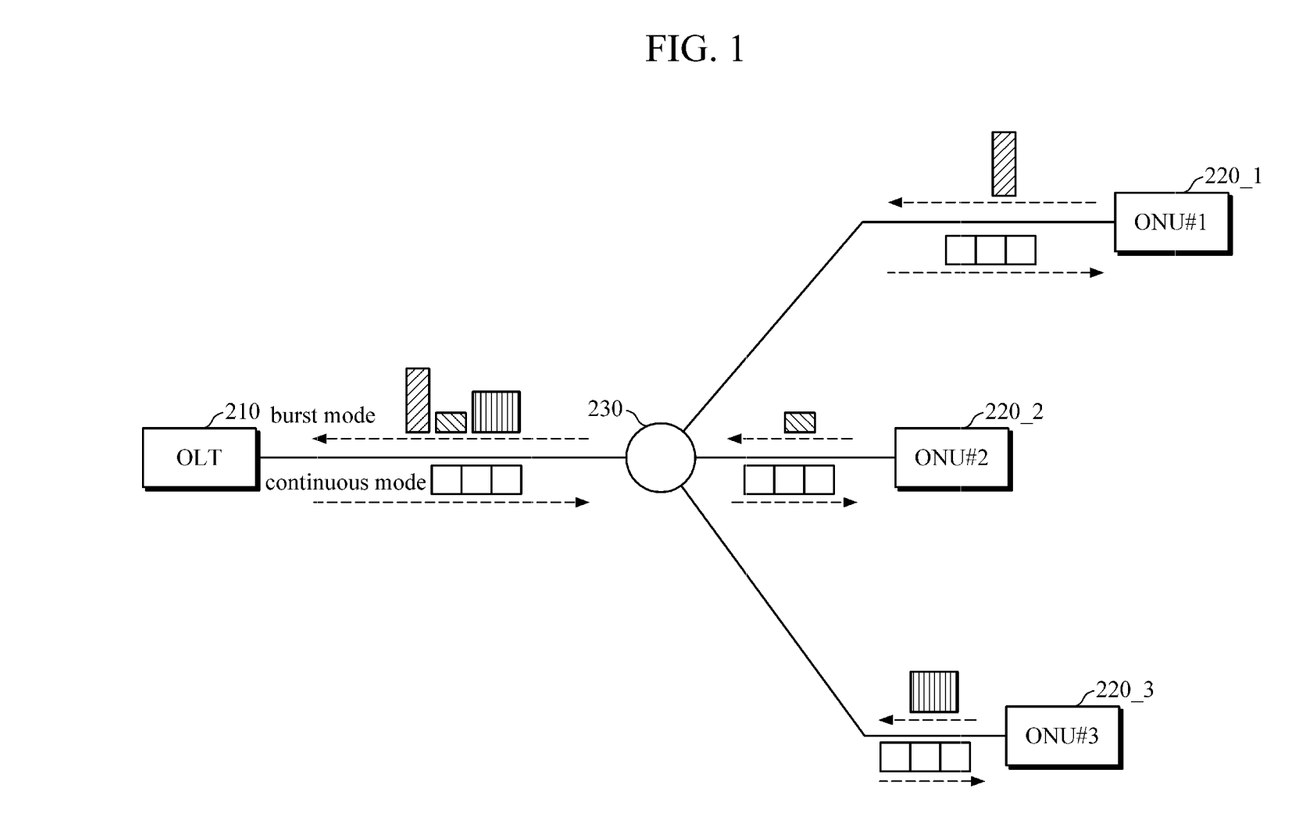
FIG. 1 illustrates an example of a configuration of a passive optical network system.
Figure 2:
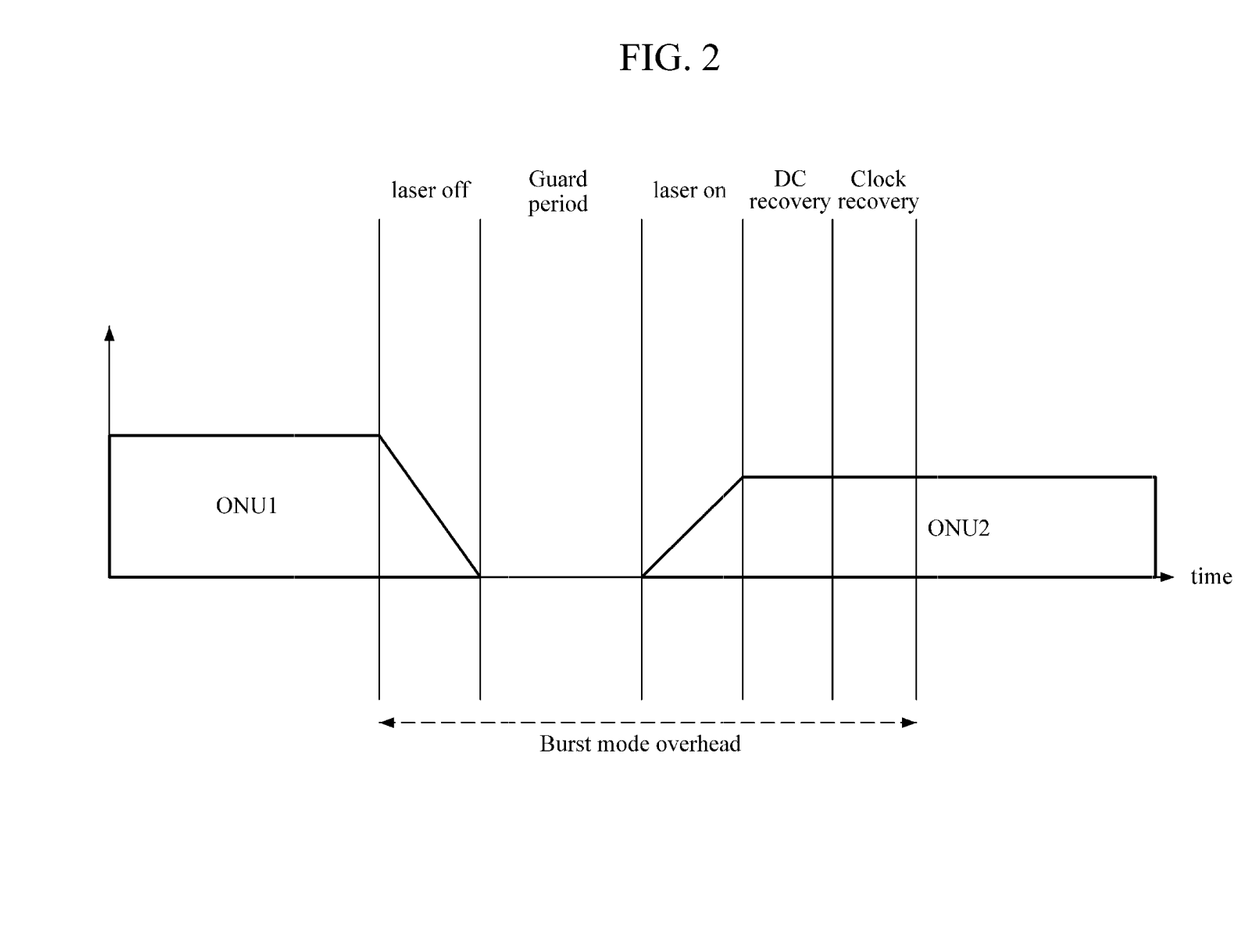
FIG. 2 illustrates an overhead included in an optical signal during burst mode transmission.

FIG. 1 illustrates an example of a configuration of a passive optical network system, and FIG. 2 illustrates an overhead included in an optical signal during burst mode transmission.

As shown in FIG. 1, the passive optical network includes an optical line terminator (OLT) 210, a passive optical splitter 230, and an optical network unit (ONU) 220. FIG. 1 illustrates that a transmission mode of a downlink optical signal and a transmission mode of an uplink optical signal are different from each other. A downlink optical signal from the OLD device 210 to the ONU 220 is broadcast in a continuous mode, i.e., to all ONUs 220_1, 220_2 and 220_3. An uplink optical signal from the ONU 220 to the OLT 210 is transmitted in a burst mode, i.e., each of the ONUs 220_1, 220_2 and 220_3 transmits data to only a time slot allocated thereto. Therefore, in the case of the uplink optical signal, the differences between the ONUs 220_1, 220_2 and 220_3 and the OLT 210 are different from one another and phases among the ONUs 220_1, 220_2 and 220_3 are not synchronized with one another and thus signal strength and phase vary according to a time slot. In FIG. 1, the size of each of boxes indicating packets represents signal strength, and different patterns drawn in the boxes indicate different phases.

FIG. 2 illustrates that an overhead is included in an optical signal received by an OLT and uplink optical signals are transmitted to an OLT from two ONUs ONU1 and ONU2 allocated to adjacent time slots. In FIG. 2, an optical packet is transmitted from ONUs, and an overhead included in an optical signal transmitted from the ONU ONU1 corresponds to the sum of a time period during which a laser diode of the ONU ONU1 is turned off, a guard time between the two ONUs ONU1 and ONU2, a time period in which a laser diode of the ONU ONU2 is turned on, and a DC recovery time and a clock data recovery time required for an OLT to perform DC recovery and clock data recovery on an uplink optical signal from the ONU ONU2.

A passive optical network according to an embodiment of the present disclosure includes an OLT 100 and a plurality of ONUs 120.

The OLT 100 and the ONUs 120 of the passive optical network of the present disclosure may operate both in a test mode and a data mode. In the test mode, when the passive optical network system is initially configured or the ONUs 120 are added, the OLT 100 remotely controls signal strength and phase of each of the ONUs 120 to reduce a DC recovery time and a clock data recovery time. In the data mode, the OLT 100 actually transmits or receives a packet after performing the test mode to remotely control signal strength and phase of each of the ONUs 120.

Figure 3:
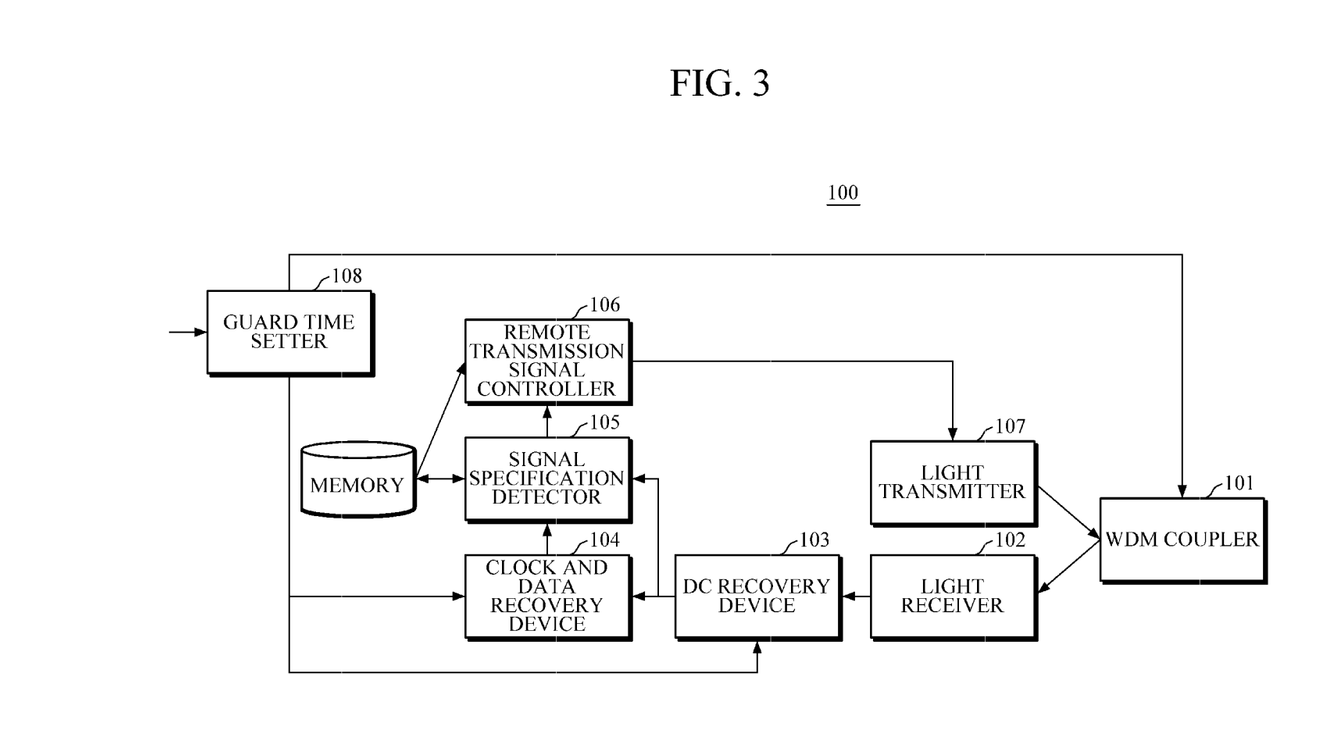
FIG. 3 is a block diagram of an optical line terminator (OLT) according to an embodiment of the present disclosure.

FIG. 3 is a block diagram of an OLT according to an embodiment of the present disclosure. An OLT 100 according to an embodiment of the present disclosure includes a wavelength-division multiplexing (WDM) coupler 101 including elements or circuits, a light receiver 102, a DC recovery device 103, a clock and data recovery device 104, a signal specification detector 105, a remote transmission signal controller 106, and a light transmitter 107.

The WDM coupler 101 is a passive element that allows an uplink optical signal and a downlink optical signal to be transmitted without interfering with wavelengths thereof.

The light receiver 102 is a burst-mode light receiver with a photodiode and converts a received optical signal into an electrical signal.

The DC recovery device 103 performs DC recovery to cancel an offset due to a direct current included in an electrical signal output from the light receiver 102 and find an accurate threshold.

The clock and data recovery device 104 extracts a synchronized clock from data transmitted in the DC-recovered signal using a delay circuit or the like and recovers the data using the extracted clock.

The signal specification detector 105 detects signal strength and phase of an electrical signal converted from a burst-mode uplink optical signal in each of channels, i.e., time slots, allocated to each of the ONUs 120, and stores a result of the detection of each of the ONUs 120 in a memory.

The remote transmission signal controller 106 determines a reference signal strength on the basis of signal strength measured for each of the ONUs 120, stores the reference signal strength in the memory, creates, in units of the ONUs 120, a signal strength control message for controlling the signal strength of each of the ONUs 120 on the basis of the reference signal strength and a phase control message for synchronization on the basis of the detected phase of each of the ONUs 120 and transmits these messages to the ONUs 120. A control message transmitted from the remote transmission signal controller 106 may be transmitted through a physical layer OAM (PLOAM) region of a frame to be transmitted. The remote transmission signal controller 106 controls all the ONUs 120 connected to the OLT 100 to control uplink optical signals received from the ONUs 120 to have certain signal strength, thereby reducing a DC recovery time of the DC recovery device 103, and to control the uplink optical signals to have a certain phase, thereby reducing a clock recovery time of the clock and data recovery device 104. By reducing the DC recovery time and the clock recovery time, the size of an overhead to be included in an uplink optical signal may be set to be small, thereby increasing data transmission efficiency.

The light transmitter 107 includes a laser diode and converts an electrical signal to be transmitted into an optical signal and transmits the optical signal.

Figure 4:
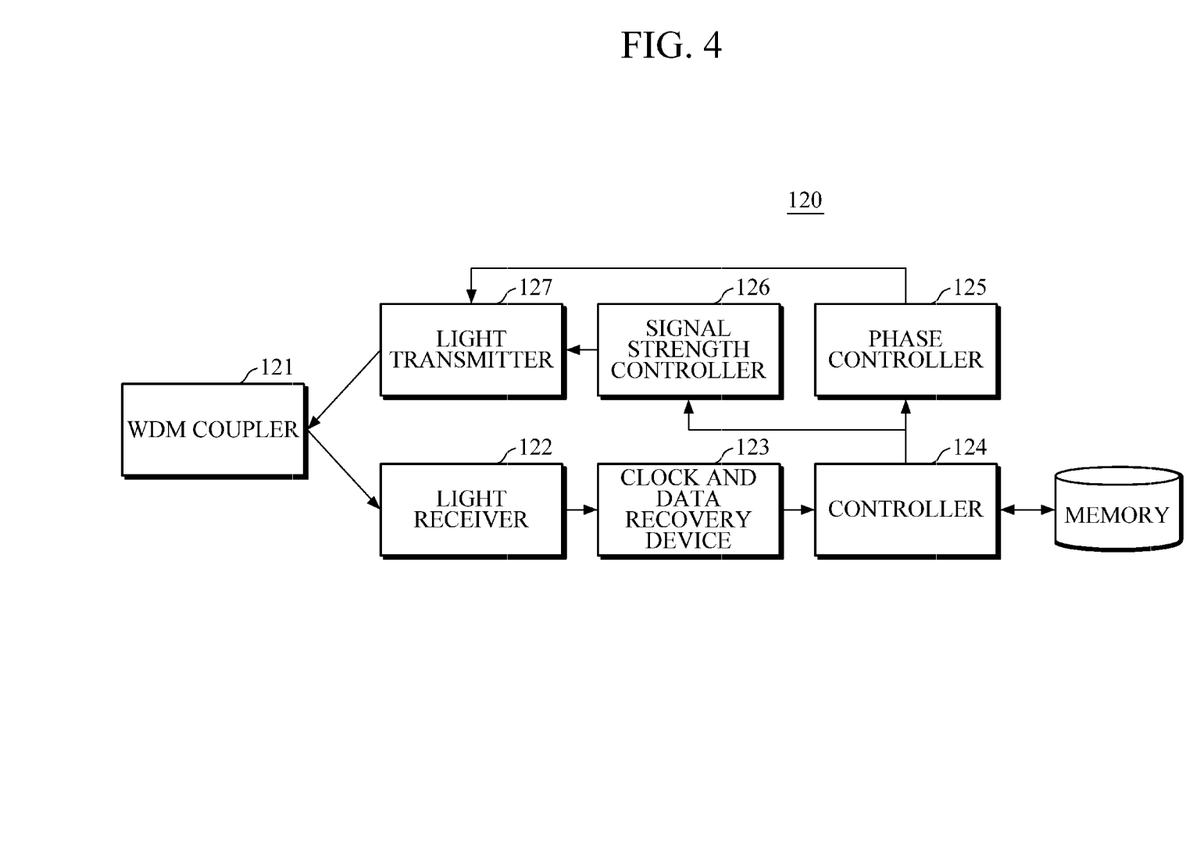
FIG. 4 is a block diagram of an optical network unit (ONU) according to an embodiment of the present disclosure.

FIG. 4 is a block diagram of an ONU according to an embodiment of the present disclosure. An ONU 120 according to an embodiment of the present disclosure includes a WDM coupler 121 configured as an element or circuit, a light receiver 122, a clock and data recovery device 123, a controller 124, a signal strength controller 126, a phase controller 125, and a light transmitter 127.

The WDM coupler 121 is a passive element that allows an uplink optical signal and a downlink optical signal to be transmitted without interfering with wavelengths thereof.

The light receiver 122 includes a photodiode and converts a received optical signal into an electrical signal.

The clock and data recovery device 123, which is a continuous mode clock and data recovery device, extracts a synchronized clock from data transmitted using a delay circuit and recovers the data using the extracted clock, unlike the clock and data recovery device 103 of the OLT 100.

The controller 124 receives and processes a signal strength control message and a phase control message from the OLT 100. The controller 124 converts the signal strength control message into a control signal and transmits the control signal to the signal strength controller 126, and converts the phase control message into a control signal and transmits the control signal to the phase controller 125.

The signal strength controller 126 controls the light transmitter 127 to change signal strength of a burst-mode uplink optical signal according to the control signal converted from the received signal strength control message.

The phase controller 125 controls the phase of the burst-mode uplink optical signal transmitted from the light transmitter 127 by controlling a delay according to the control signal converted from the phase control message.

The light transmitter 127 is a burst-mode light transmitter with a laser diode and converts an electrical signal to be transmitted into an optical signal and transmits the optical signal.

According to an embodiment of the present disclosure, it is difficult to accurately grasp a degree to which a signal transmitted from the OLT 100 to the ONUs 120 has attenuated, based on the signal strength control message transmitted from the remote transmission signal controller 106 of the OLT 100 and thus this message may deliver signal strength increase/decrease information a specific value indicating signal strength to increase or reduce signal strength. Therefore, the remote transmission signal controller 106 of the OLT 100 may repeatedly transmit the signal strength control message to the same channel, i.e., the same ONU 120, to control signal strength from the ONU 10.

The phase control message transmitted from the remote transmission signal controller 106 of the OLT 100 may deliver delay increase/decrease information.

Figure 5:
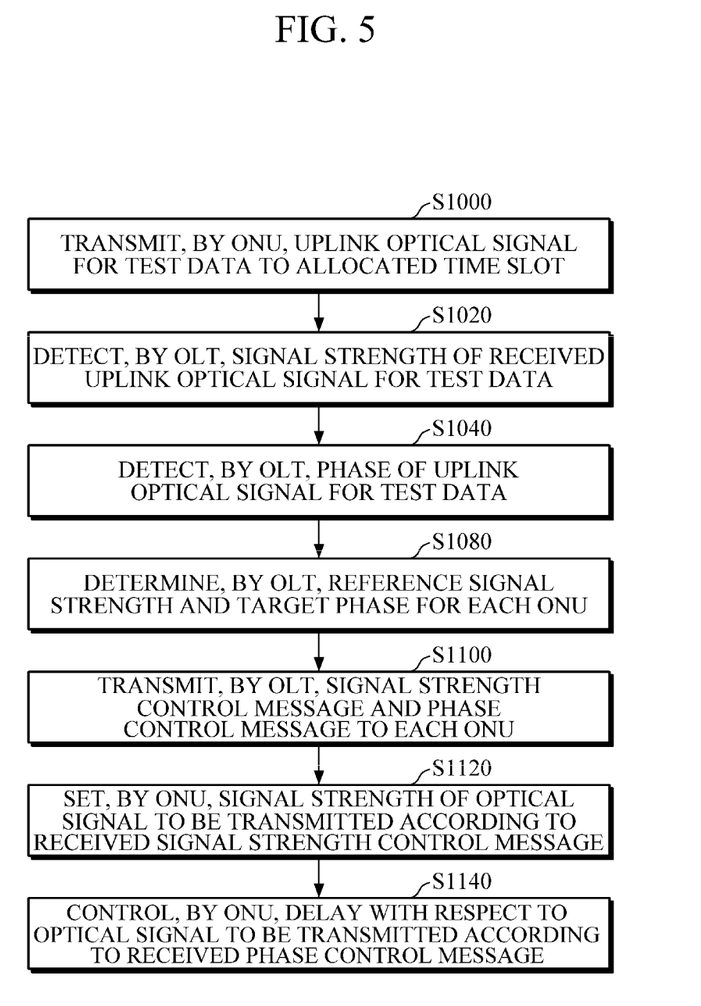
FIG. 5 illustrates a process of remotely controlling an ONU by an OLT according to an embodiment the present disclosure.

FIG. 5 illustrates a process of remotely controlling an ONU by an OLT according to an embodiment of the present disclosure. The process of FIG. 5 is performed in the test mode. Each ONU 120 transmits an uplink optical signal for test data to an OLT 100 to a time slot allocated thereto (S1000). The OLT 100 detects signal strength and phase of the uplink optical signal, for the test data, received from each ONU 120 (S1020 and S1040) and stores a result of the detection in a memory. The OLT 100 determines reference signal strength on the basis of the detected signal strength of each ONU 120 and determines a phase adjustment value for each ONU 120 on the basis of the detected phase of each ONU 120 (S1080). The OLT 100 creates a signal strength control message, which includes signal strength increase/decrease information for increasing/decreasing signal strength, and a phase control message, which includes delay increase/decrease information for adjusting phase, of each ONU 120 and transmits these messages (S1100). The ONU 120 sets signal strength of a transmission signal to be increased or decreased according to the received signal strength control message (S1120) and increases or decreases a delay according to the received phase control message (S1140). The process of remotely controlling the ONU 120 by the OLT 100, which is performed in the test mode, may be repeatedly performed until signal strength of an optical signal received from all of ONUs 120 becomes the same as the reference signal strength and until a phase of a signal received from the ONUs 120 becomes the same as a desired phase.

Even when a passive optical network system of the present disclosure performs the test mode to allow the OLT device 100 to equalize strengths of signals received from all the ONUs 120 and adjust a delay to change phases thereof to desired phase, when a network is initially configured, strength of a signal from a certain ONU 120 may change or a phase of the signal may be shifted during an operation, i.e., an operation of a data mode. In this case, in the passive optical network of the present disclosure, the signal strength or delay of the signal from the ONU 120 should be controlled by the OLT 100 even when the test mode is not performed again.

The remote transmission signal controller 106 of the OLT 100 according to an embodiment of the present disclosure may create a signal strength control message on the basis of the difference between reference signal strength and signal strength of a burst-mode uplink optical signal detected by the signal specification detector 105 in the data mode and transmit the message.

The remote transmission signal controller 106 of the OLT 100 according to an embodiment of the present disclosure may create a phase control message on the basis of the difference between a desired phase and a phase of a burst-mode uplink optical signal detected by the signal specification detector 105 in the data mode and transmit this message.

In the passive optical network system of the present disclosure, when the OLT 100 controls strength and delay of a signal from each ONU 120 in the test mode, the OLT 100 may reduce a DC recovery time and a clock data recovery time with respect to a burst-mode uplink optical signal. Data transmission efficiency may be increased by reducing an overhead in the burst mode on the basis of the reduced DC recovery time and clock data recovery time.

The OLT 100 may further include a guard time setter 108 for setting a burst mode guard time according to a user input. The burst-mode guard time refers to a time period in which overhead bits are transmitted, and, in the case of an optical signal form the ONU1 shown in the example of FIG. 2, corresponds to the sum of a time period during which a laser diode of the ONU ONU1 is turned off, a guard time between the two ONUs ONU1 and ONU2, a time period in which a laser diode of the ONU ONU2 is turned on, and times of DC recovery and clock data recovery with respect to an uplink optical signal from the ONU ONU2 by an OLT. That is, a user may set the burst-mode guard time through the guard time setter 108 of the OLT 100 on the basis of a DC recovery time and a clock data recover time calculated in the test mode.

The ONU 120 may also include a guard time setter for setting the burst-mode guard time according to a user input.

Figure 6:
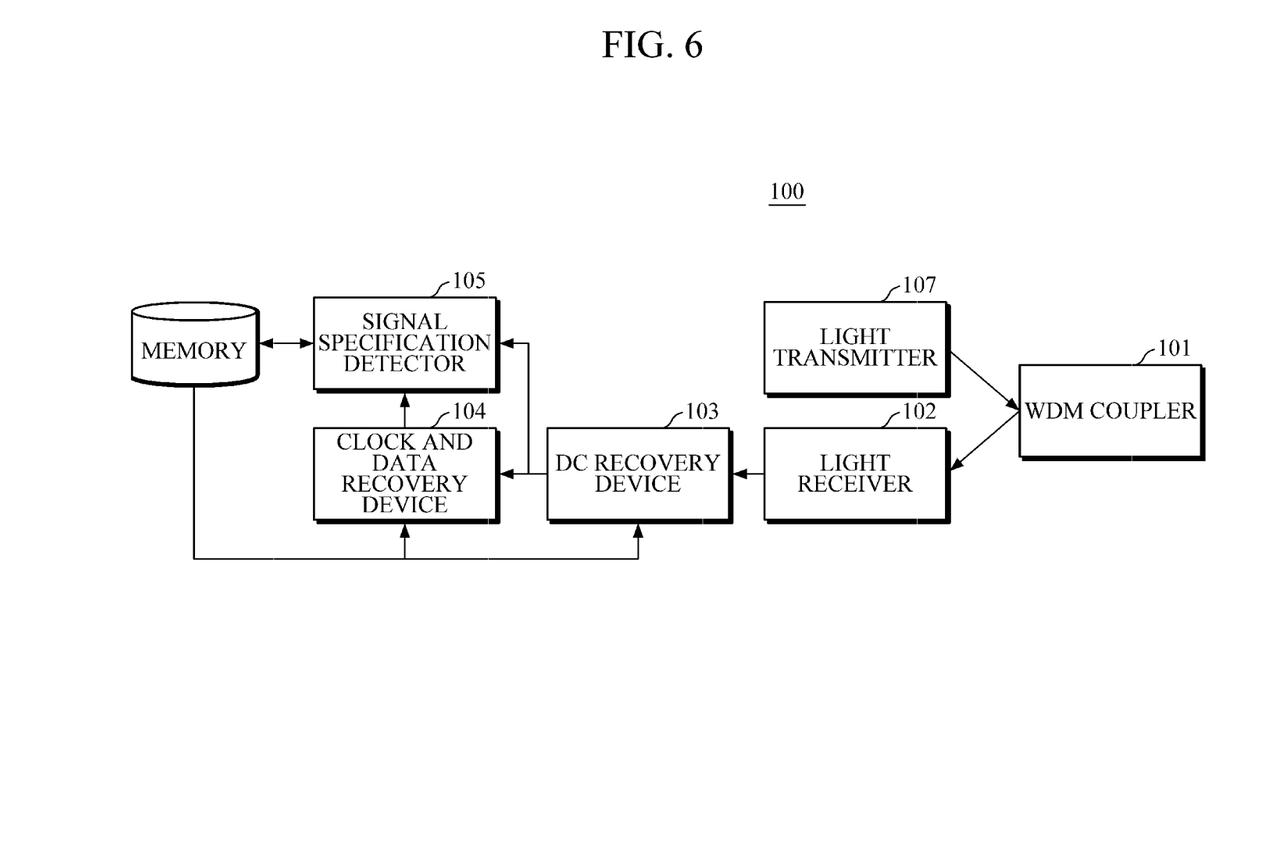
FIG. 6 is a block diagram of an OLT according to another embodiment of the present disclosure.

FIG. 6 is a block diagram of an OLT according to another embodiment of the present disclosure. An OLT 100 according to another embodiment of the present disclosure includes a WDM coupler 101 including elements or circuits, a light receiver 102, a DC recovery device 103, a clock and data recovery device 104, a signal specification detector 105, and a light transmitter 107.

The WDM coupler 101 is a passive element that allows an uplink optical signal and a downlink optical signal to be transmitted without interfering with wavelengths thereof.

The light receiver 102 is a burst-mode light receiver with a photodiode and converts a received optical signal into an electrical signal.

The DC recovery device 103 performs DC recovery to cancel an offset due to a direct current included in an electrical signal output from the light receiver 102 and find an accurate threshold. In this case, the DC recovery device 103 may quickly perform DC recovery using parameters such as a previously detected offset value for each ONU 120.

The clock and data recovery device 104 extracts a synchronized clock from transmitted data in the DC-recovered signal using a delay circuit or the like and recovers data using the extracted clock. In this case, the clock and data recovery device 104 may quickly recover a clock using parameters such as a previously detected delay value for each ONU 120.

The signal specification detector 105 may store parameters, such as an offset value detected from an electrical signal converted from a burst-mode uplink optical signal received in each of channels, i.e., time slots, allocated to ONU 120, in units of ONUs 120 in a memory, and may store parameters, such as a delay value detected from the electrical signal, in units of ONUs 120 in the memory.

Therefore, the OLT 100 of the passive optical network system of the present embodiment may reduce a DC recovery time and a clock and data recovery time without controlling strength and a phase of a signal from each of ONUs 120 by transmitting a control message using a PLOAM to the ONUs 120.

The light transmitter 107 includes a laser diode and converts an electrical signal to be transmitted into an optical signal and transmits the optical signal.

In a passive optical network of the present disclosure, an OLT may remotely control strength and a phase of an optical signal from an ONU to reduce a time required to recover a burst mode clock and data BM-CDR for an uplink optical signal.

While the present disclosure has been described above with respect to embodiments in conjunction with the accompanying drawings, the present disclosure is not limited thereto and should be interpreted to cover various modifications that will be apparent to those of ordinary skill in the art. The claims are intended to cover such modifications.

What is claimed is:

1. A passive optical network system comprising an optical line terminator (OLT) and a plurality of optical network units (ONUs),
    wherein the OLT comprises:
        a power measurer configured to measure signal strength of an electrical signal converted from a burst-mode uplink optical signal received in each of channels allocated to the ONUs in a test mode;
        a phase detector configured to detect phase of the electrical signal obtained by conversion for each of the ONUs in the test mode; and
        a remote transmission signal controller configured to determine reference signal strength on the basis of signal strength measured for each of the ONUs, and create and transmit a signal strength control message for control of signal strength of each of the ONUs according to the reference signal strength, and a phase control message for synchronization on the basis of a phase detected for each of the ONUs in units of ONUs, and
    the ONU comprises:
        a control message receiver configured to receive the signal strength control message and the phase control message from the OLT,
        a signal strength controller configured to control signal strength of the burst-mode uplink optical signal to be changed according to the received signal strength control message; and
        a phase controller configured to control a delay according to the received phase control message so as to adjust a phase of the burst-mode uplink optical signal.

2. The passive optical network system of claim 1, wherein the signal strength control message and the phase control message transmitted from the remote transmission signal controller of the OLT comprise signal strength increase/decrease information and delay increase/decrease information, respectively.

3. The passive optical network system of claim 2, wherein the remote transmission signal controller of the OLT creates and transmits the signal strength control message on the basis of a difference between the reference signal strength and signal strength of the burst-mode uplink optical signal received by an ONU and measured by the power measurer in a data mode.

4. The passive optical network system of claim 2, wherein the remote transmission signal controller of the OLT creates and transmits the phase control message on the basis of a difference between a desired phase and a phase of the burst-mode uplink optical signal received by an ONU and detected by the phase detector in a data mode.

5. The passive optical network system of claim 1, wherein the OLT further comprises a guard time setter configured to set a burst mode guard time according to a user input.

6. The passive optical network system of claim 1, wherein each of the ONUs further comprises a guard time setter configured to set a burst-mode guard time according to a user input.

7. An optical line terminator (OLT), comprising:
    a power measurer configured to measure signal strength of an electrical signal converted from a burst-mode uplink optical signal received in each of channels allocated to a plurality of optical network units (ONUs) in a test mode;
    a phase detector configured to detect phase of the electrical signal obtained by conversion for each of the ONUs in the test mode; and
    a remote transmission signal controller configured to determine reference signal strength on the basis of signal strength measured for each of the ONUs, and create and transmit a signal strength control message for control of signal strength of each of the ONUs according to the reference signal strength, and a phase control message for synchronization on the basis of a phase detected for each of the ONUs.

8. The OLT of claim 7, wherein the signal strength control message and the phase control message transmitted from the remote transmission signal controller of the OLT comprise signal strength increase/decrease information and delay increase/decrease information, respectively.

9. The OLT of claim 8, wherein the remote transmission signal controller of the OLT creates and transmits the signal strength control message on the basis of a difference between the reference signal strength and signal strength of the burst-mode uplink optical signal received by an ONU and measured by the power measurer in a data mode.

10. The OLT of claim 8, wherein the remote transmission signal controller of the OLT creates and transmits the phase control message on the basis of a difference between a desired phase and a phase of the burst-mode uplink optical signal received by an ONU and detected by the phase detector in a data mode.

11. The OLT of claim 7, wherein the OLT further comprises a guard time setter configured to set a burst mode guard time according to a user input.

12. An optical network unit (ONU), comprising:
a control message receiver configured to receive a signal strength control message and a phase control message from an optical line terminator (OLT);
a signal strength controller configured to control signal strength of a burst-mode uplink optical signal to be changed according to the received signal strength control message, wherein the burst-mode uplink optical signal is transmitted by the ONU to the OLT in a channel allocated to the ONU; and
a phase controller configured to control a delay according to the received phase control message so as to adjust a phase of the burst-mode uplink optical signal.

13. The ONU of claim 12, wherein the signal strength control message and the phase control message received from the remote transmission signal controller of the OLT comprise signal strength increase/decrease information and delay increase/decrease information, respectively.

14. The ONU of claim 12, wherein the ONU further comprises a guard time setter configured to set a burst-mode guard time according to a user input.

* * * * *